United States Patent
Ding et al.

(10) Patent No.: US 10,216,329 B2
(45) Date of Patent: Feb. 26, 2019

(54) TOUCH DISPLAY PANEL

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Hong Ding, Shanghai (CN); Qijun Yao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 303 days.

(21) Appl. No.: 15/209,109

(22) Filed: Jul. 13, 2016

(65) Prior Publication Data

US 2017/0277349 A1  Sep. 28, 2017

(30) Foreign Application Priority Data

Mar. 24, 2016 (CN) .......................... 2016 1 0172618

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04111* (2013.01)

(58) Field of Classification Search
CPC ......... G06F 2203/04111; G06F 3/0412; G06F 3/0418; G06F 3/044
See application file for complete search history.

(56) References Cited

U.S. PATENT DOCUMENTS

| | | | | |
|---|---|---|---|---|
| 2016/0070395 A1* | 3/2016 | Hung | .................... | G09G 5/003 345/173 |
| 2016/0253026 A1* | 9/2016 | Long | ........................ | G03F 7/20 345/174 |
| 2016/0328073 A1* | 11/2016 | Lai | ........................ | G06F 3/0416 |
| 2017/0185225 A1* | 6/2017 | Ding | ....................... | G06F 3/044 |

FOREIGN PATENT DOCUMENTS

CN  104808860 A  7/2015

* cited by examiner

*Primary Examiner* — Viet D Pham
(74) *Attorney, Agent, or Firm* — Kilpatrick Townsend & Stockton LLP

(57) ABSTRACT

A touch display panel includes multiple first touch electrode units and multiple second touch electrode units. The first touch electrode units are arranged in an array in a first direction and a second direction, and the first touch electrode units are insulated from one another in a display region of the touch display panel. Each of the second touch electrode units includes multiple second strip-shaped electrodes electrically connected, and the second strip-shaped electrodes extend in the second direction. At least one of the first touch electrode units is arranged between any two adjacent second strip-shaped electrodes in the first direction. The second touch electrode units are insulated from one another in the display region, and a ratio of an effective width of the second touch electrode unit in the first direction to a width of the first touch electrode unit in the first direction is in a range from 0.8 to 1.2 inclusively.

19 Claims, 14 Drawing Sheets

TOUCH DISPLAY PANEL

CROSS REFERENCE OF RELATED APPLICATION

The present application claims the priority to Chinese Patent Application No. 201610172618.5, titled "TOUCH DISPLAY PANEL", filed on Mar. 24, 2016 with the State Intellectual Property Office of the People's Republic of China, the content of which is incorporated herein by reference in its entirety.

FIELD

The present disclosure relates to the technical field of touch display, and in particular to a touch display panel.

BACKGROUND

With the development of display technology, more and more display panels are integrated with a touch function based on a mutual-capacitive touch technology or a self-capacitive touch technology. The self-capacitive touch technology is more applicable to a light-thin display panel since only one touch electrode layer is needed as compared with the mutual-capacitive touch technology.

Currently, in a self-capacitive touch display panel, a common electrode in the display panel doubles as touch electrodes in a time-share driving manner by dividing the common electrode into multiple block-shaped electrodes, which leads to a further reduced thickness of the display panel, an improved production efficiency and a reduced production cost.

However, a graphic-visible phenomenon usually occurs in displaying of a touch display panel according to the conventional technologies, thereby reducing a display effect of the touch display panel.

SUMMARY

In order to address the above issue, the present disclosure provides a touch display panel, so as to improve a display effect of the touch display panel.

In order to address the above issue, the following technical solution is provided according to embodiments of the present disclosure.

Embodiments provide a touch display panel, which includes multiple first touch electrode units and multiple second touch electrode units. The multiple first touch electrode units are arranged in an array in a first direction and a second direction, and the multiple first touch electrode units are insulated from one another in a display region of the touch display panel. Each of the second touch electrode units includes multiple second strip-shaped electrodes electrically connected. The second strip-shaped electrodes extend in the second direction, and at least one of the multiple first touch electrode units is arranged between any two adjacent second strip-shaped electrodes in the first direction. The multiple second touch electrode units are insulated from one another in the display region of the touch display panel, and a ratio between an effective width of each of the second touch electrode units in the first direction and a width of each of the first touch electrode units in the first direction is in a range from 0.8 to 1.2 inclusively.

As compared with the conventional technologies, the above technical solution has the following advantages.

The touch display panel according to the embodiments of the present disclosure includes multiple first touch electrode units insulated from one another and multiple second touch electrode units insulated from one another. The multiple first touch electrode units are arranged in an array in a first direction and a second direction. The second touch electrode units include multiple second strip-shaped electrodes electrically connected. The second strip-shaped electrodes extend in the second direction and at least one of the first touch electrode units is arranged between any two adjacent second strip-shaped electrodes in the first direction. A ratio between an effective width of the second touch electrode unit in the first direction and a width of the first touch electrode unit in the first direction is in a range from 0.8 to 1.2 inclusively. In this case, in the displaying of the touch display panel, a voltage disturbance on the first touch electrode unit is substantially the same as a voltage disturbance on the second touch electrode unit. It is relieved a graphic-visible phenomenon in the existing touch display panel, which is caused by large differences between widths of touch electrodes in a case that the touch electrodes serve as common electrodes, thereby improving the display effect of the touch display panel.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained based on these drawings without any creative work.

DETAILED DESCRIPTION OF EMBODIMENTS

The technical solutions according to the embodiments of the present disclosure are described clearly and completely in conjunction with the drawings hereinafter. It is apparent that the described embodiments are only a few rather than all of the embodiments according to the present disclosure. Any other embodiments obtained by those skilled in the art based on the embodiments in the present disclosure without any creative work fall into the scope of the present disclosure.

Specific details are described in the following description, so that the present disclosure can be understood completely. The present disclosure may also be embodied in other ways, a similar extension can be made by those skilled in the art without departing from principle of the present disclosure. Therefore, the present disclosure is not limited to the specific embodiments described below.

As described in the background, a graphic-visible phenomenon usually occurs in the displaying of the touch display panel according to the conventional technologies, thereby reducing the display effect of the touch display panel.

Figure 1:
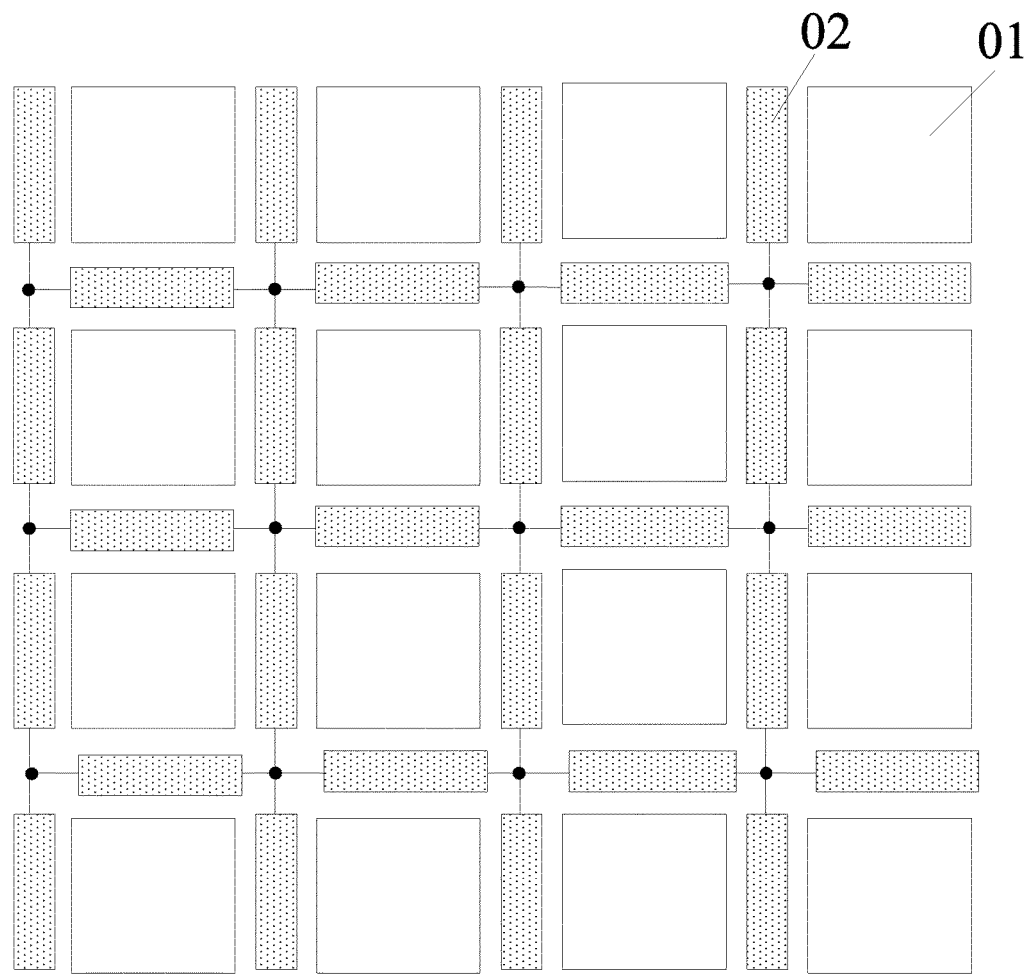
FIG. 1 is a schematic structural diagram of a touch display panel according to the conventional technology.

It is found by the inventor based on research that, in order to improve two-finger resolution in the touch detection of the touch display panel, common electrodes in the existing touch display panel generally include block-shaped electrodes 01 arranged in an array and strip-shaped electrodes 02 arranged alternately with the block-shaped electrodes 01, as shown in FIG. 1. In a touch period, the block-shaped electrodes 01 are used for touch detection, and the strip-shaped electrodes 02, which are electrically connected to one another, are used to provide a reference voltage in the touch period.

However, since a large difference exists between a width of the block-shaped electrode 01 and a width of the strip-shaped electrode 02, interferences on an electric potential across the block-shaped electrode 01 by other voltage signals in the touch display panel are different from interferences on an electric potential across the strip-shaped electrode 02 by other voltage signals in the touch display panel, in the displaying of the touch display panel. In this case, a voltage disturbance on the block-shaped electrode 01 is different from a voltage disturbance on the strip-shaped electrode 02, and a graphic-visible phenomenon occurs in a display picture of the touch display panel, thereby reducing the display effect of the touch display panel.

Figure 2:
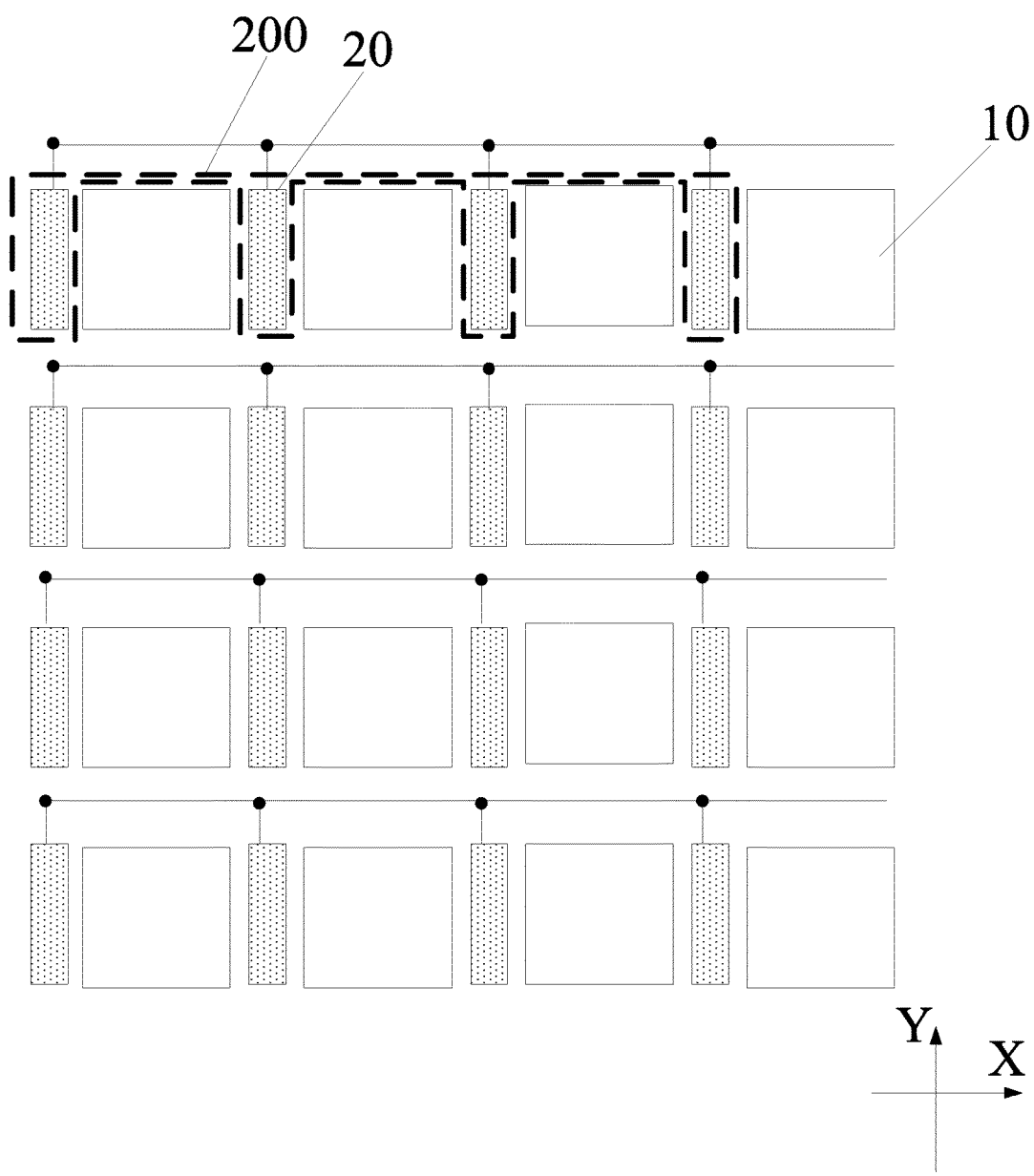
FIG. 2 is a schematic structural diagram of a touch display panel according to an embodiment of the present disclosure.

In view of the above, a touch display panel is provided according to an embodiment. As shown in FIG. 2, the touch display panel includes multiple first touch electrode units 10 and multiple second touch electrode units 200.

The multiple first touch electrode units 10 are arranged in an array in a first direction X and a second direction Y. The multiple first touch electrode units 10 are insulated from one another in a display region of the touch display panel.

The second touch electrode unit 200 includes multiple second strip-shaped electrodes 20. The second strip-shaped electrodes 20 extend in the second direction Y and one of the first touch electrode units 10 is arranged between any two adjacent second strip-shaped electrodes 20 in the first direction X.

The multiple second touch electrode units 200 are insulated from one another in the display region of the touch display panel. A ratio between an effective width of the second touch electrode unit 200 in the first direction X and a width of the first touch electrode unit 10 in the first direction X is in a range from 0.8 to 1.2 inclusively.

Figure 3:
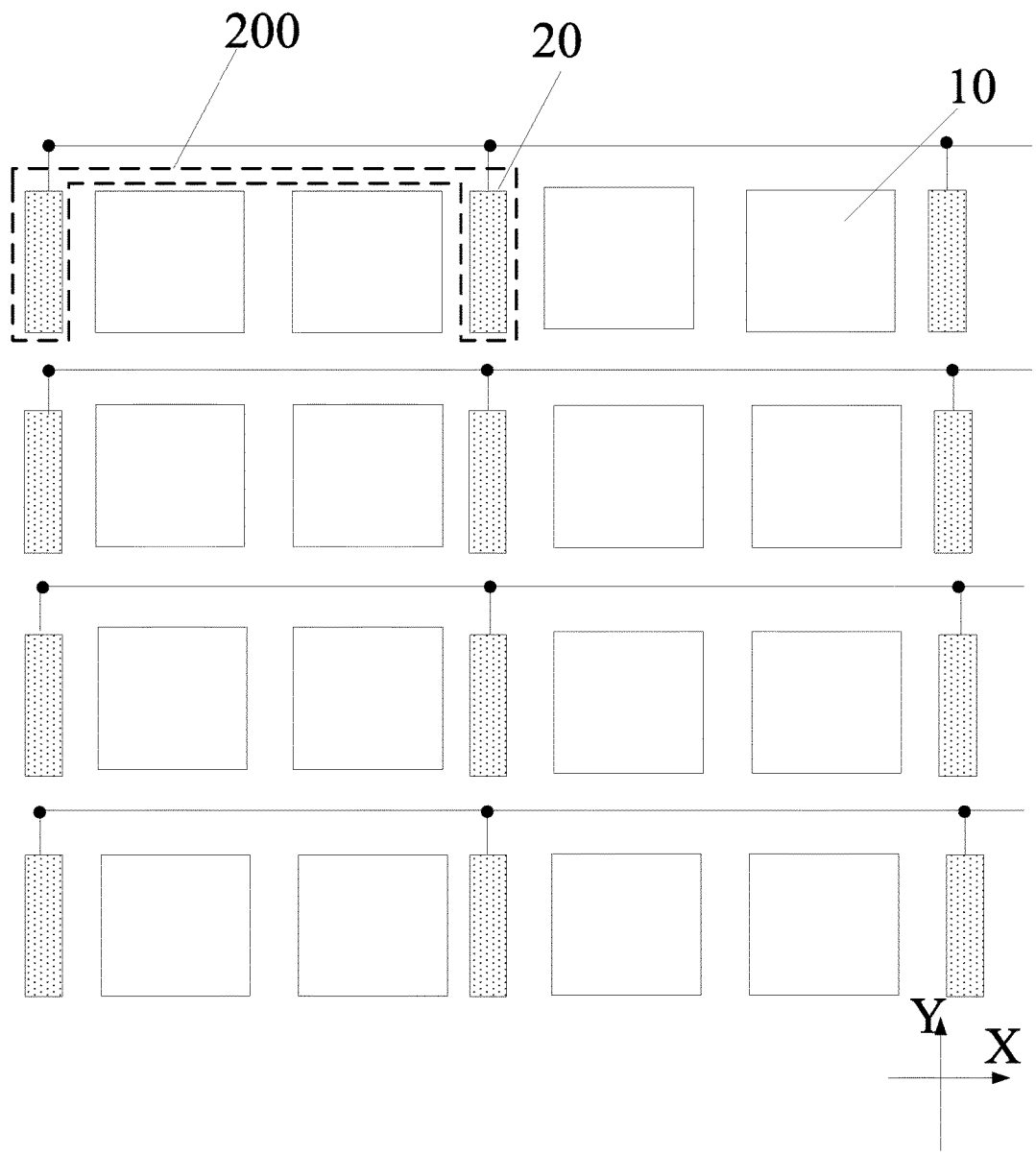
FIG. 3 is a schematic structural diagram of a touch display panel according to an embodiment of the present disclosure.

It should be noted that, in the embodiment of the present disclosure, the first touch electrode unit 10 is insulated from the second touch electrode unit 200. In touch detection, the first touch electrode unit 10 is configured to provide a touch signal and the second touch electrode unit 200 is configured to provide a reference voltage. At least one of the first touch electrode units 10 is arranged between any two adjacent second strip-shaped electrodes 20 of the second touch electrode unit 200. For example, in an embodiment of the present disclosure, as shown in FIG. 2, one first touch electrode unit 10 is arranged between any two adjacent second strip-shaped electrodes 20 of the second touch electrode unit 200. In another embodiment of the present disclosure, as shown in FIG. 3, multiple first touch electrode units 10 are arranged between any two adjacent second strip-shaped electrodes 20 of the second touch electrode unit 200. The number of the first touch electrode units arranged between any two adjacent strip-shaped electrodes is not limited herein, as the case may be.

Figure 4:
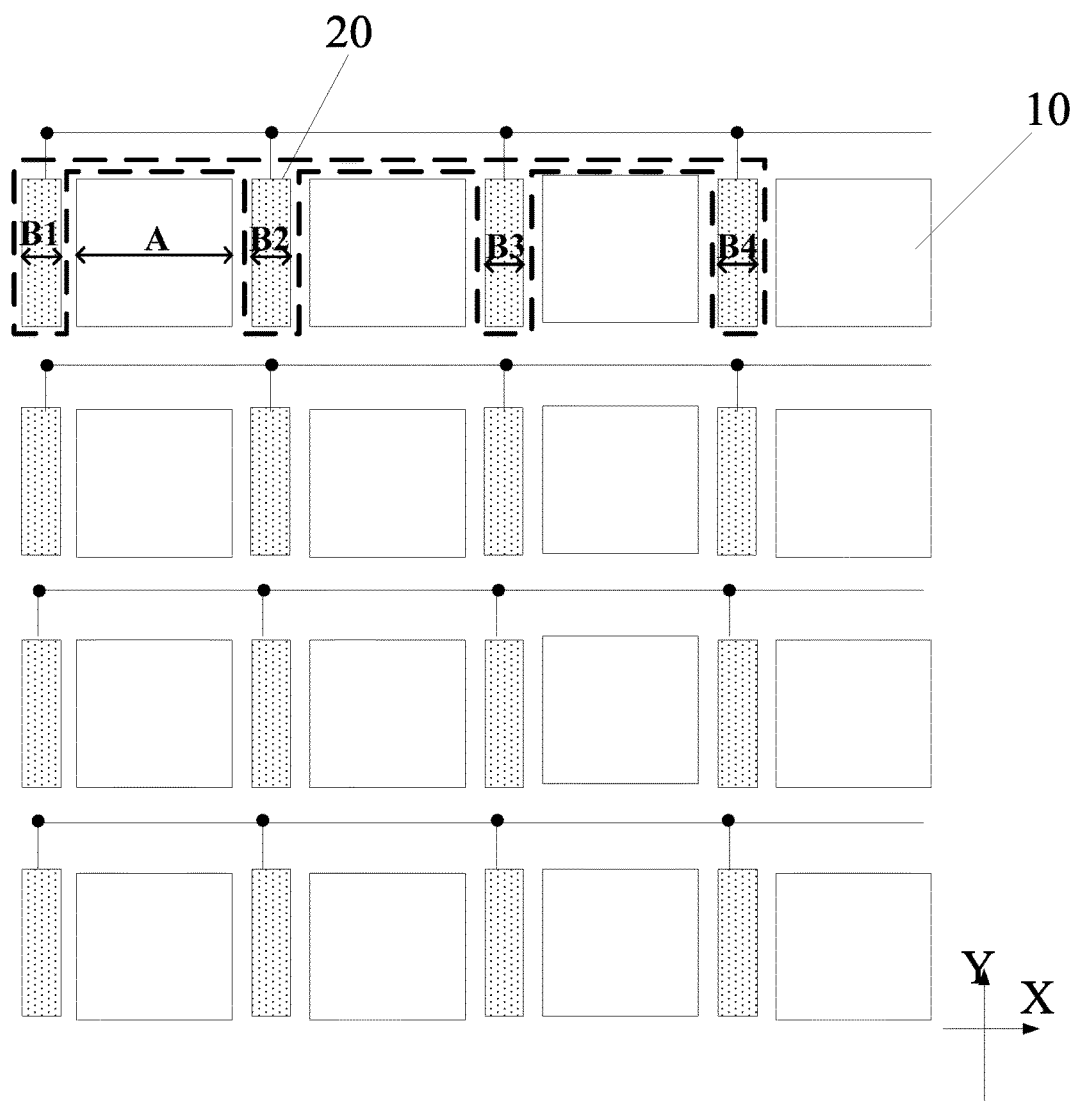
FIG. 4 is a schematic structural diagram of a touch display panel according to an embodiment of the present disclosure.

It should also be noted that, in the embodiment of the present disclosure, the effective width of the second touch electrode unit 200 in the first direction X is a sum of widths of the second strip-shaped electrodes 20 of the second touch electrode unit 200 in the first direction X. As shown in FIG. 4, when the second touch electrode unit 200 includes four second strip-shaped electrodes 20, the effective width of the second touch electrode unit 200 in the first direction X is B1+B2+B3+B4. In this embodiment, a ratio between the sum of the widths of the second strip-shaped electrodes 20 of the second touch electrode unit 200 in the first direction X, B1+B2+B3+B4, and the width A of the first touch electrode unit 10 in the first direction X is in a range from 0.8 to 1.2 inclusively, i.e. $0.8 \leq (B1+B2+B3+B4)/A \leq 1.2$.

It can be seen from the above that, in the touch display panel according to the present disclosure, the effective width of the second touch electrode unit 200 in the first direction X, B1+B2+B3+B4, has a little difference from the width A of the first touch electrode unit 10 in the first direction X, since the ratio of the effective width of the second touch electrode unit 200 in the first direction X, B1+B2+B3+B4, to the width A of the first touch electrode unit 10 in the first direction X is in the range from 0.8 to 1.2 inclusively. In this case, in the displaying of the touch display panel, a voltage disturbance on the first touch electrode unit 10 is substantially the same as a voltage disturbance on the second touch electrode unit 200. Therefore, it is relieved a graphic-visible phenomenon in the touch display panel, which is caused by a large difference between the width of the first touch electrode unit 10 and the effective width of the second touch electrode unit 200 in the first direction X in a case that the first touch electrode unit 10 and the second touch electrode unit 200 serve as common electrodes, thereby improving the display effect of the touch display panel.

In some embodiments, the effective width of the second touch electrode unit 200 in the first direction X is the same as the width of the first touch electrode unit 10 in the first direction X. In those embodiments, a difference between the voltage disturbance on the first touch electrode unit 10 and the voltage disturbance on the second touch electrode unit 200 in the displaying of the touch display panel is further reduced. Hence, it is further relieved the graphic-visible phenomenon in the touch display panel, which is caused by the large difference between the width of the first touch electrode unit 10 and the effective width of the second touch electrode unit 200 in the first direction X in a case that the first touch electrode unit 10 and the second touch electrode unit 200 serve as common electrodes, thereby improving the display effect of the touch display panel.

Figure 5:
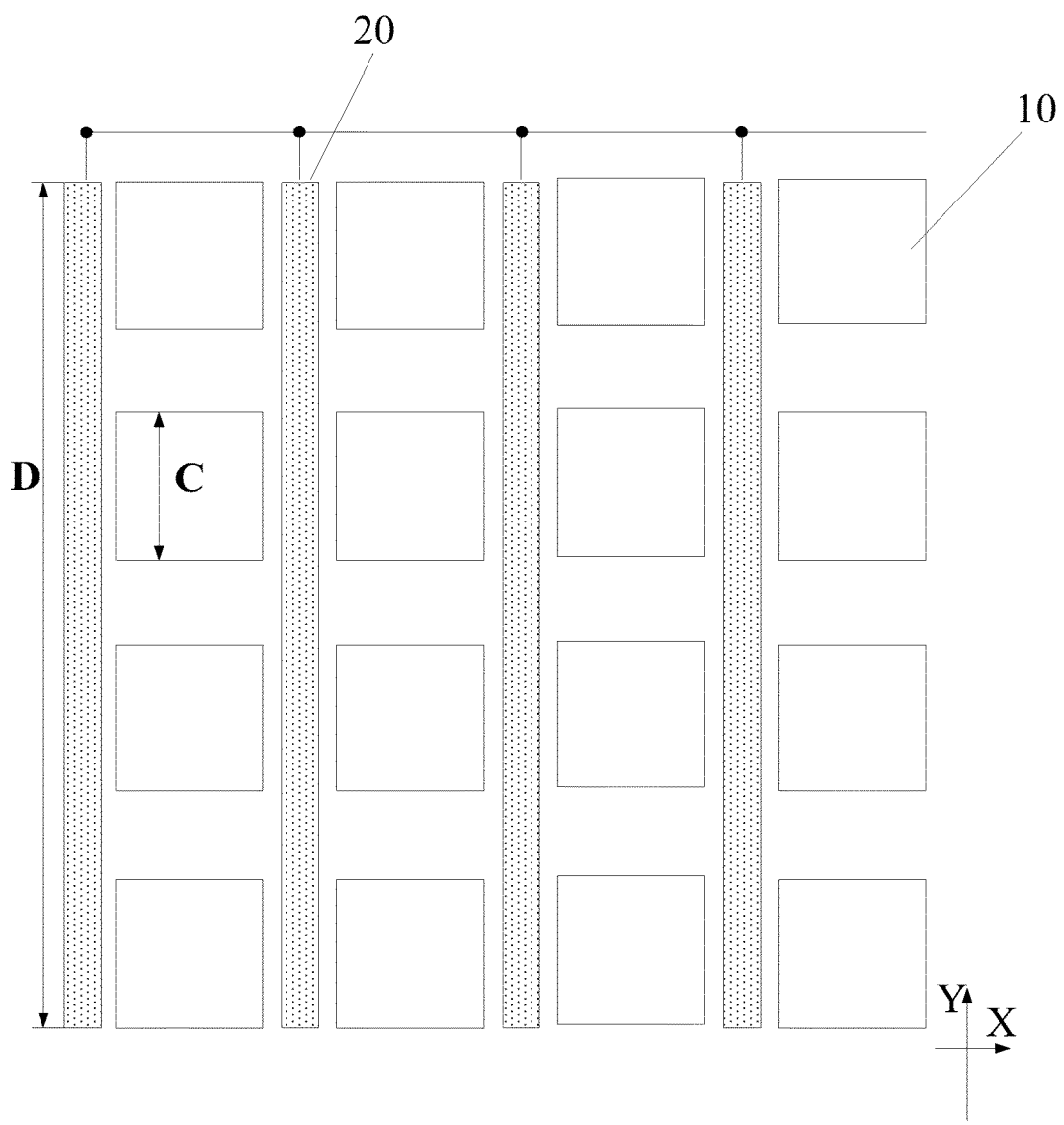
FIG. 5 is a schematic structural diagram of a touch display panel according to an embodiment of the present disclosure.
Figure 6:
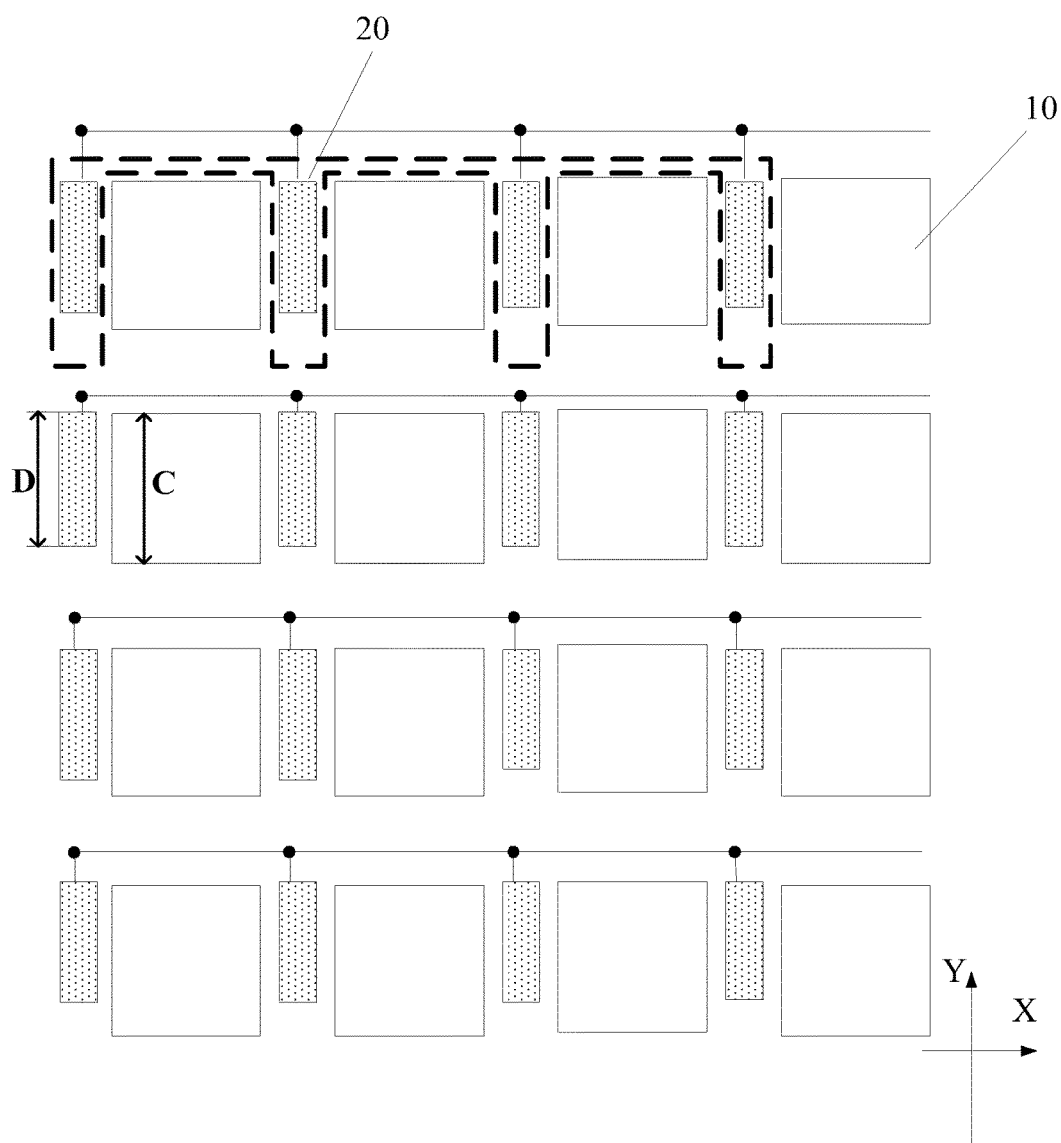
FIG. 6 is a schematic structural diagram of a touch display panel according to an embodiment of the present disclosure.
Figure 7:
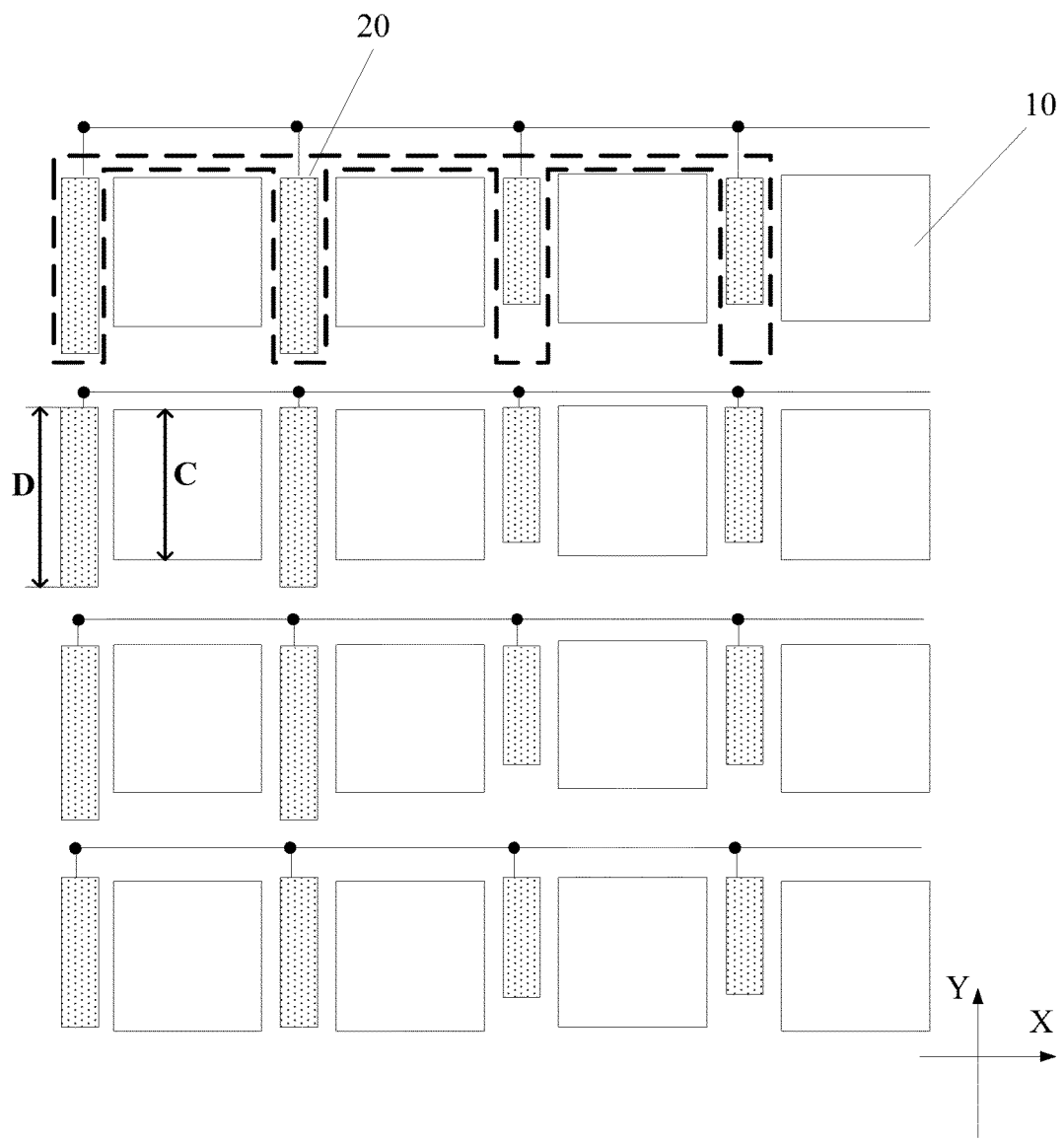
FIG. 7 is a schematic structural diagram of a touch display panel according to an embodiment of the present disclosure.
Figure 8:
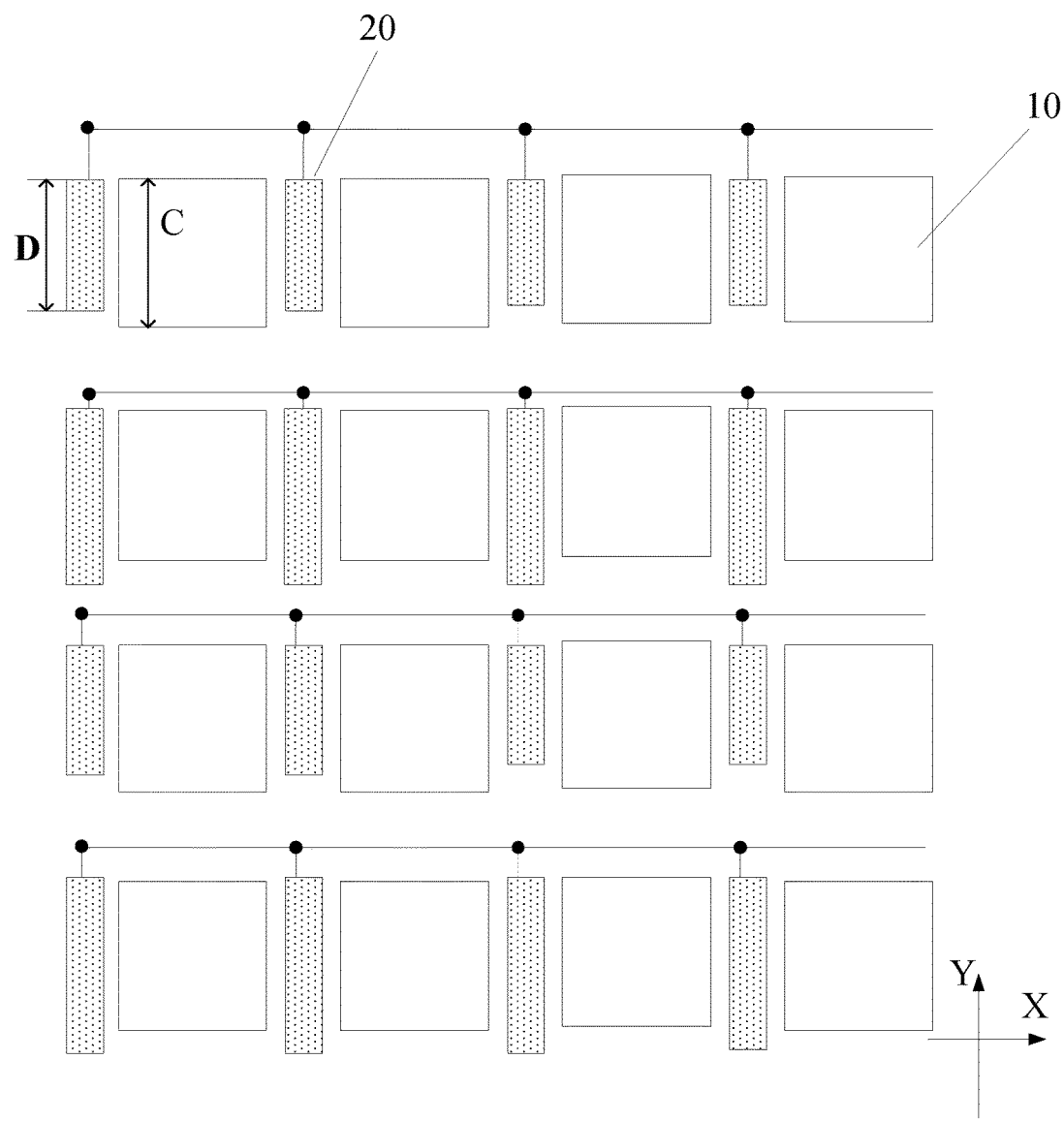
FIG. 8 is a schematic structural diagram of a touch display panel according to an embodiment of the present disclosure.

In some embodiments, as shown in FIG. 5, a width D of the second strip-shaped electrode 20 of the second touch electrode unit 200 in the second direction Y may be greater than a width C of the first touch electrode unit 10 in the second direction Y. In still some embodiments, as shown in FIG. 6, the width D of the second strip-shaped electrode 20 of the second touch electrode unit 200 in the second direction Y are less than the width C of the first touch electrode unit 10 in the second direction Y. In yet some embodiments, the width of the second strip-shaped electrode of the second touch electrode unit in the second direction is equal to the width of the first touch electrode unit in the second direction. In still some embodiments, as shown in FIG. 7, widths D of a portion of the second strip-shaped electrodes 20 of the second touch electrode unit 200 in the second direction Y are greater than the width C of the first touch electrode unit 10 in the second direction Y while widths of another portion of the second strip-shaped electrodes 20 of the second touch electrode unit 200 in the second direction Y are less than the width C of the first touch electrode unit 10 in the second direction Y. In still some embodiments, as shown in FIG. 8, widths D of the second strip-shaped electrodes 20 of a portion of the second touch electrode units 200 in the second direction Y are greater than the width C of the first touch electrode unit 10 in the second direction Y while widths of the second strip-shaped electrodes 20 of another portion of the second touch electrode units 200 in the second direction Y are less than the width C of the first touch electrode unit 10 in the second direction Y. It should be understood the afore-described embodiments with respect to the widths D of the second strip-shaped electrodes 20 are not intended to be limiting.

Figure 9:
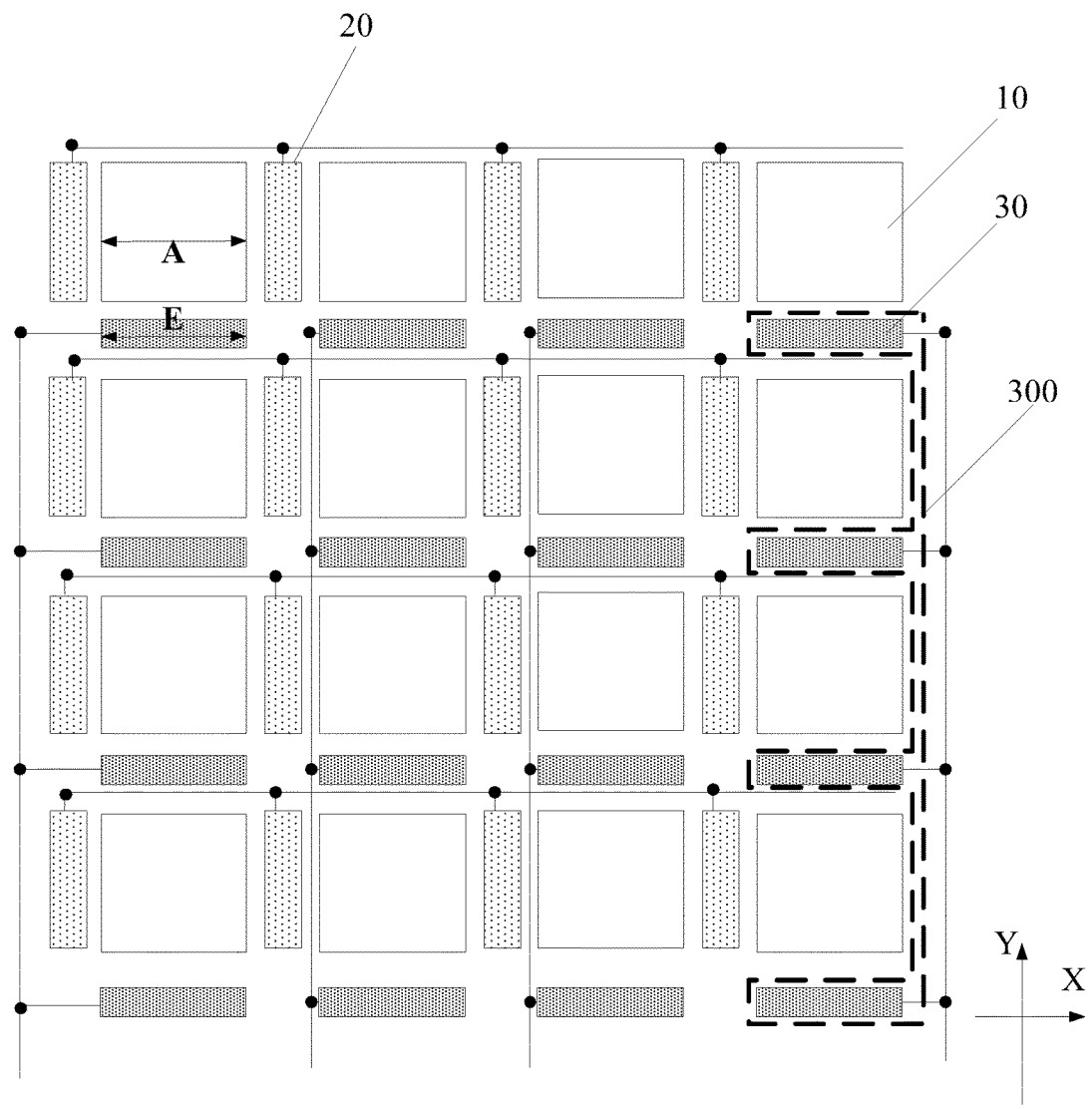
FIG. 9 is a schematic structural diagram of a touch display panel according to an embodiment of the present disclosure.

In some embodiments, as shown in FIG. 9, in order to further improve the two-finger resolution in the touch detection of the touch display panel, the touch display panel may further include multiple third touch electrode units 300.

The third touch electrode unit 300 includes multiple third strip-shaped electrodes 30 electrically connected. The third strip-shaped electrodes 30 extend in the first direction X and at least one of the first touch electrode units 10 is arranged between any two adjacent third strip-shaped electrodes 30 in the second direction Y. In the display region of the touch display panel, the multiple third touch electrode units 300 are insulated from one another, and the third touch electrode units 300 are insulated from the second touch electrode units and the first touch electrode units 10. The third touch electrode unit 300 is configured to provide a reference voltage in the touch detection.

It should be noted that, in the embodiment of the present disclosure, a ratio between an effective width E of the third touch electrode unit 300 in the first direction X, and the width A of the first touch electrode unit in the first direction X is in a range from 0.8 to 1.2 inclusively. In this case, in the displaying of the touch display panel, a voltage disturbance on the first touch electrode unit 10 is substantially the same as a voltage disturbance on the third touch electrode unit 300. It is relieved a graphic-visible phenomenon in the touch display panel, which is caused by a large difference between the width of the first touch electrode unit 10 and the effective width of the third touch electrode unit 300 in the first direction X in a case that the first touch electrode unit 10 and the third touch electrode unit 300 serve as common electrodes, thereby improving the display effect of the touch display panel. The effective width of the third touch electrode unit 300 in the first direction X is the width E of the third strip-shape electrode 30 of the third touch electrode unit 300 in the first direction X.

In some embodiments, the effective width E of the third touch electrode unit 300 in the first direction X is the same as the width A of the first touch electrode unit 10 in the first direction X. In this case, it is further relieved the graphic-visible phenomenon in the touch display panel, which is caused by the large difference between the width of the first touch electrode unit 10 and the effective width of the third touch electrode unit 300 in the first direction X in a case that the first touch electrode unit 10 and the third touch electrode unit 300 serve as the common electrodes, thereby improving the display effect of the touch display panel.

In some embodiments, in one of the second touch electrode units 200, widths of the multiple second strip-shaped electrodes 20 in the first direction X are all the same, thereby facilitating touch signal detection and fabrication of the second strip-shaped electrode 20 in the touch display panel. However, this is not intended to be limiting. In other embodiments, in one of the second touch electrode units 200, widths of the multiple second strip-shaped electrodes 20 in the first direction X may be different, as the case may be.

It should be noted that, in a case that the widths of the multiple second strip-shaped electrodes 20 in one of the second touch electrode units 200 are all the same, the width A of the first touch electrode unit in the first direction X is N times the width of the second strip-shaped electrode 20 in the first direction X, and N is a positive integer greater than 1. In this embodiment, each of the second touch electrode units 200 includes N second strip-shaped electrodes 20 electrically connected, and a width of each of the strip-shaped electrodes 20 in the first direction is A/N. Optionally, N may equal to 4, which is not limited herein, as the case may be.

In some embodiments, the multiple second strip-shaped electrodes 20 electrically connected are arranged alternately with the multiple first touch electrode units 10 in a one-to-one manner in the first direction X. In those embodiments, it is convenient to electrically connect the second strip-shaped electrodes 20 of the second touch electrode unit 200. Also, it is relieved a graphic-visible phenomenon which occurs since the second strip-shaped electrodes 20 of the second touch electrode unit 200 do not respond timely due to overlong electrical connection lines between the second strip-shaped electrodes 20 of the second touch electrode unit 200, thereby further improving the display effect of the touch display panel.

Figure 10:
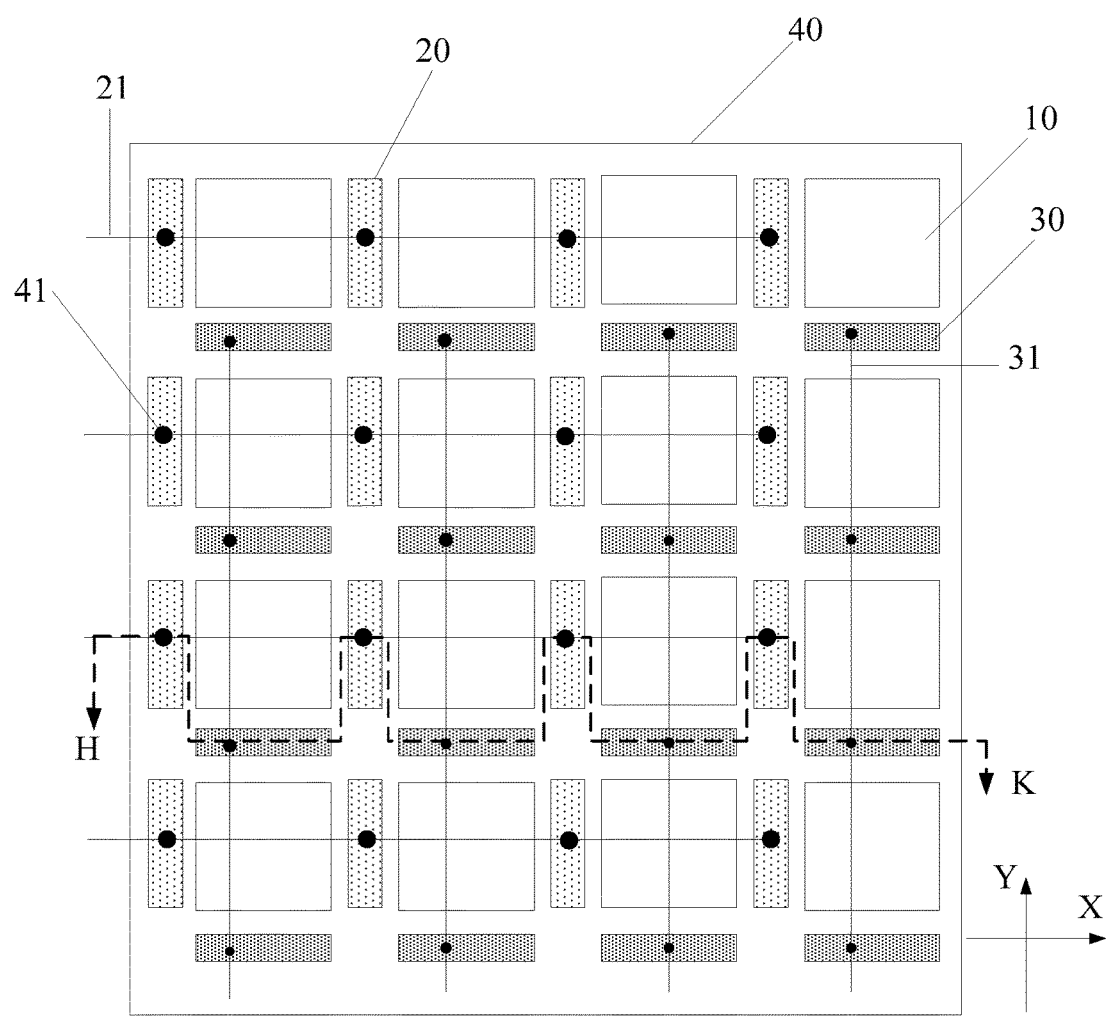
FIG. 10 is a schematic structural diagram of a touch display panel according to an embodiment of the present disclosure.
Figure 11:
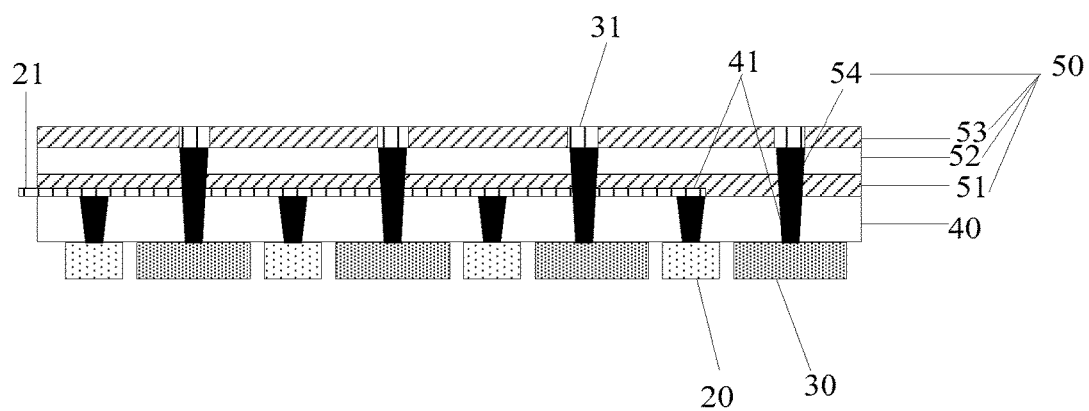
FIG. 11 is a cross-sectional view of the touch display panel shown in FIG. 10.

In some embodiments, as shown in FIG. 10 and FIG. 11, FIG. 11 is a cross-sectional diagram of a structure shown in FIG. 10 taken along a dotted line HK, the touch display panel further includes a first insulation layer 40 and a touch metal layer 50. The first insulation layer 40 includes multiple via holes 41. The touch metal layer 50 includes multiple second electrode connection lines 21 and multiple third electrode connection lines 31. The multiple second strip-shaped electrodes 20 of the second touch electrode units 200 are electrically connected via the second electrode connection lines 21 through the via holes 41, and the multiple third strip-shaped electrodes 30 of the third touch electrode units 300 are electrically connected via the third electrode connection lines 31 through the via holes 41.

It should be noted that, in some embodiments, the touch metal layer 50 may include a second electrode connection line layer 51, a third electrode connection line layer 53 and a second insulation layer 52 arranged between the second electrode connection line layer 51 and the third electrode connection line layer 53. Thus it is ensured that multiple second electrode connection lines 21 in the second electrode connection line layer 51 are insulated from multiple third electrode connection lines 31 in the third electrode connection line layer 53.

Figure 12:
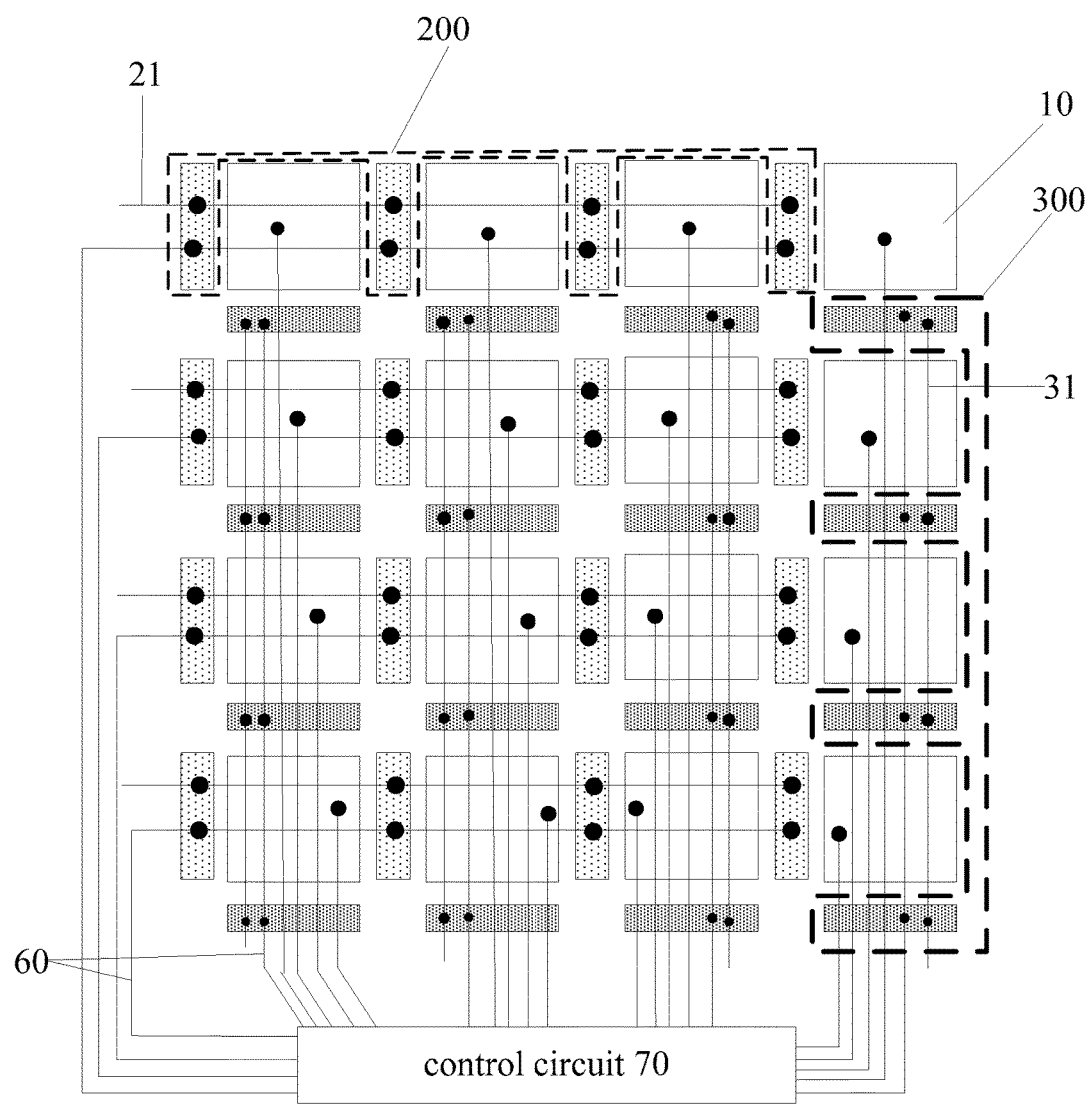
FIG. 12 is a schematic structural diagram of a touch display panel according to an embodiment of the present disclosure.
Figure 13:
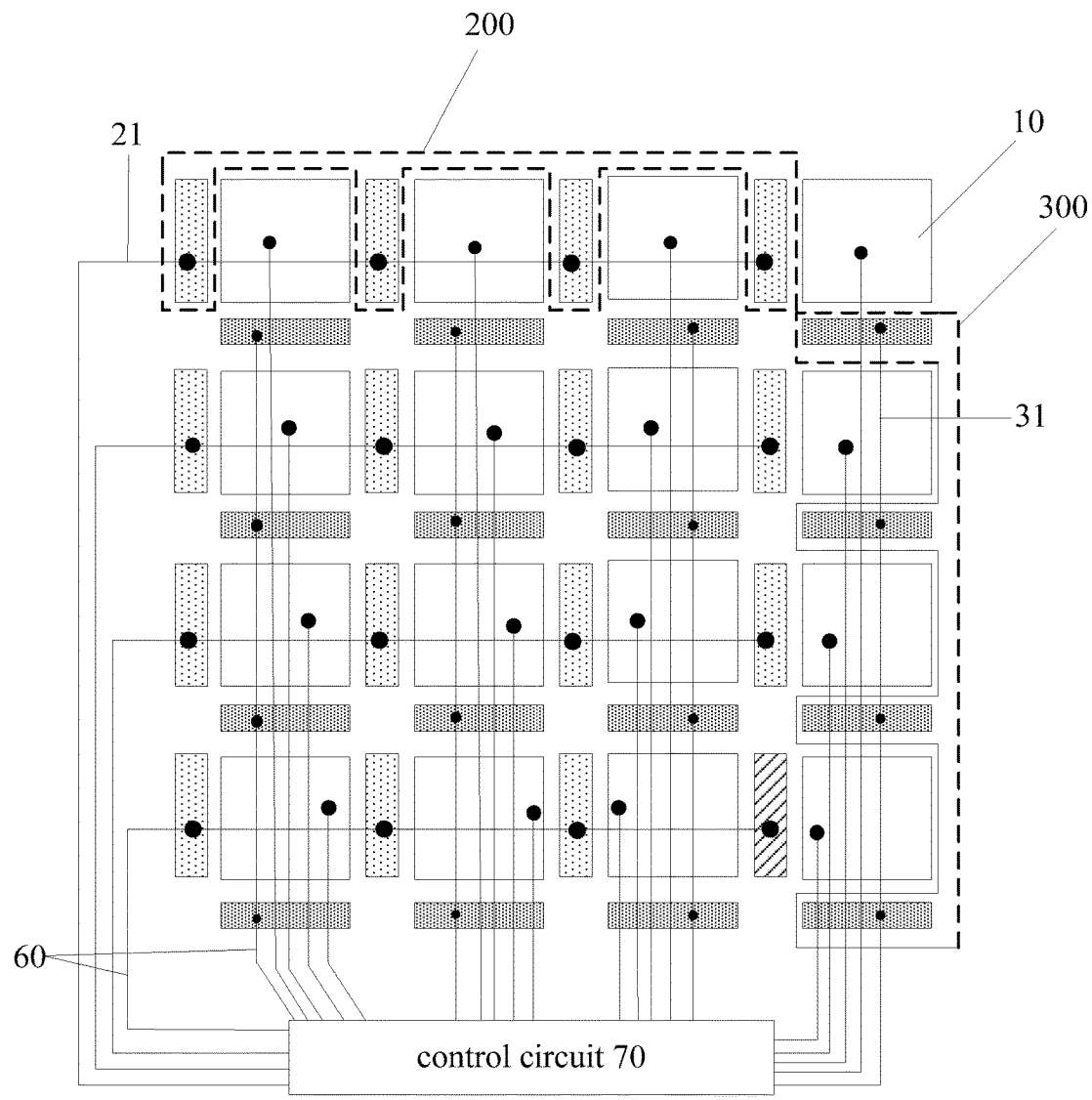
FIG. 13 is a schematic structural diagram of a touch display panel according to an embodiment of the present disclosure.

It should be further noted that, in some embodiments, as shown in FIG. 12, the touch metal layer 50 may further include multiple touch signal lines 60. Each of the first touch electrode units 10 is electrically connected to one end of at least one touch signal line 60, each of the second touch electrode units 200 is electrically connected to one end of at least one touch signal line 60 and each of the third touch electrode units 300 is electrically connected to one end of at least one touch signal line 60. The other ends of the respective touch signal lines 60 are electrically connected to a control circuit 70 to transmit signals to the first touch electrode units 10, the second touch electrode units 200 and the third touch electrode units 300. In a touch detection period, the control circuit 70 provides a touch signal to the first touch electrode unit 10 and provides reference voltage signals to the second touch electrode unit and the third touch electrode unit through the touch signal lines 60. In those embodiments, touch detection may be achieved by detecting changes of capacitance signals at the first touch electrode units. In other embodiments, as shown in FIG. 13, the second touch electrode unit 200 may transmit a signal via the second electrode connection line 21 and the touch electrode unit 300 may transmit a signal via the third electrode connection line 31, to reduce the number of electrode lines in the touch display panel, which is not limited herein, as the case may be.

It should be noted that, when the first touch electrode unit 10, the second touch electrode unit 200 and the third touch electrode unit 300 serve as common electrodes, voltage disturbances on them are mainly caused by interferences from pixel voltages corresponding to sub-pixels in the touch display panel. Most of the existing touch display panels are driven in a row driving manner. That is, displaying is completed by scanning the sub-pixels in the touch display panel row by row and sub-pixels located in a same row are switched on at the same time. In this case, a graphic-visible phenomenon in a direction of the gate line of the touch display panel is more apparent than a graphic-visible phenomenon in a direction of the data line of the touch display panel in the displaying of the touch display panel. Therefore, in some embodiments, the first direction X is the same as an extending direction of the gate line of the touch display panel. However, the present disclosure is not limited in this regard. In other embodiments, the first direction X may be the same as an extending direction of the data line of the touch display panel, as the case may be.

In some embodiments, the first touch electrode unit 10, the second touch electrode unit 200 and the third touch electrode unit 300 serve as touch electrodes in the touch period and serve as common electrodes in the display period. The common electrodes provides common signals to display pixels in the touch display panel in the displaying of the touch display panel, thereby reducing a thickness of the touch display panel and being applicable to a light-thin touch display panel. In still some embodiments, the first touch electrode unit 10, the second touch electrode unit 200 and the third touch electrode unit 300 serve as self-capacitive touch electrodes. For example, the first touch electrode unit 10 serves as a detection electrode, and the second touch electrode unit 200 and the third touch electrode unit 300 serve as reference electrodes. A capacitor is formed between the detection electrode and the reference electrode or the ground. In a case that touching is performed on a surface of the touch display panel, a capacitance value between a detection electrode at a location corresponding to the touching and the ground (or the reference electrode) is changed. Therefore, touch detection may be achieved by detecting a change of the capacitance value at the first touch electrode unit 10.

It can be seen from the above that, the touch display panel according to the embodiments of the present disclosure includes multiple first touch electrode units 10 insulated from one another and multiple second touch electrode units 200 insulated from one another. The multiple first touch electrode units 10 are arranged in an array in a first direction and a second direction. The second touch electrode unit 200 includes multiple second strip-shaped electrodes 20 electrically connected. The second strip-shaped electrodes extend in the second direction and at least one of the first touch electrode units 10 is arranged between any two adjacent second strip-shaped electrodes in the first direction. A ratio between an effective width of the second touch electrode unit 200 in the first direction, and a width of the first touch electrode unit in the first direction is in a range from 0.8 to 1.2 inclusively. When a voltage disturbance on the first touch electrode unit 10 is substantially the same as a voltage disturbance on the second touch electrode unit 200 in the displaying of the touch display panel, and it is relieved a graphic-visible phenomenon in the existing touch display panel, which is caused by a large difference between widths of touch electrodes in a case that the touch electrodes serve as common electrodes, thereby improving the display effect of the touch display panel.

Another touch display panel is further provided according to an embodiment of the present disclosure. Different from the above touch display panels, in the touch display panel according to the embodiment of the present disclosure, a width of the first touch electrode unit 10, an effective width of the second touch electrode unit 200 and an effective width of the third touch electrode unit 300 in the second direction Y are defined. In the following, the embodiment is described by assuming that the first direction X is the same as the extending direction of the gate line in the touch display panel and the second direction Y is the same as the extending direction of the data line in the touch display panel.

Figure 14:
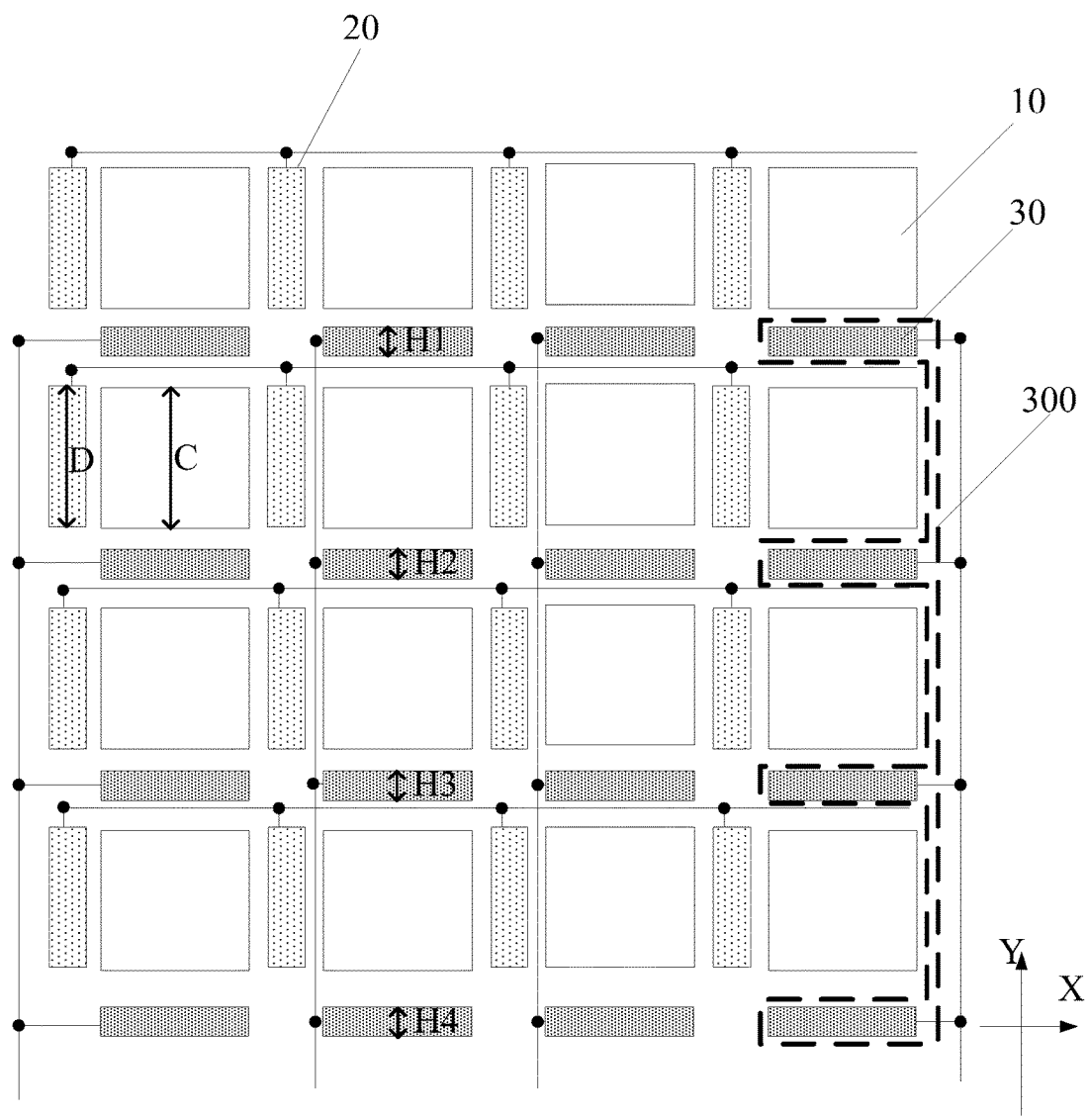
FIG. 14 is a schematic structural diagram of a touch display panel according to an embodiment of the present disclosure.

In certain embodiments, as shown in FIG. 14, a ratio of an effective width D of the second touch electrode unit 200 in the second direction Y to a width C of the first touch electrode unit 10 in the second direction Y is in a range from 0.5 to 1.5 inclusively. A ratio between an effective width of the third touch electrode unit 300 in the second direction Y, and the width C of the first touch electrode unit 10 in the second direction Y is in the range from 0.5 to 1.5 inclusively. In this case, it is relieved a graphic-visible phenomenon in the touch display panel, which is caused by a large difference between the width of the first touch electrode unit 10 and the effective width of the second touch electrode unit 200 in the second direction Y or caused by a large difference between the width of the first touch electrode unit 10 and the effective width of the third touch electrode unit 300 in the second direction Y, thereby improving the display effect of the touch display panel. The effective width of the second touch electrode unit 200 in the second direction Y equals to a sum of widths of the second strip-shaped electrodes 20 of the second touch electrode unit 200 in the second direction Y. The effective width of the third touch electrode unit 300 in the second direction Y equals to a sum of widths of the third strip-shaped electrodes 30 of the third touch electrode unit 300 in the second direction Y. For example, in a case that the touch electrode unit 300 includes four third strip-shaped electrodes 30, the effective width of the third touch electrode unit 300 in the second direction Y equals to a sum of widths of the four third strip-shaped electrodes 30 included in the third touch electrode unit 300 in the second direction Y, H1+H2+H3+H4.

In some embodiments, the width of the first touch electrode unit 10 in the second direction Y is the same as the effective width of the second touch electrode unit 200 in the second direction Y. The width of the first touch electrode unit 10 in the second direction Y is the same as the effective width of the third touch electrode unit 300 in the second direction Y. In this case, it is further relieved the graphic-visible phenomenon in the touch display panel, which is caused by the large difference between the width of the first touch electrode unit 10 and the effective width of the second touch electrode unit 200 in the second direction Y or caused by the large difference between the width of the first touch electrode unit 10 and the effective width of the third touch electrode unit 300 in the second direction Y, thereby improving the display effect of the touch display panel.

In some embodiments, in one of the third touch electrode units 300, widths of the multiple third strip-shaped electrodes 30 in the second direction Y are the same to facilitate the detection of a touch signal and the fabrication of the third strip-shaped electrode. However, this is not intended to be limiting. In other embodiments, in one of the third touch electrode unit 300, the widths of the multiple third strip-shaped electrodes 30 may be different, as the case may be.

It should be noted that, if the widths of the multiple second strip-shaped electrodes 30 in the second direction Y in one of the third touch electrode units 300 are the same, the width C of the first touch electrode unit 10 in the second direction Y is M times the width of the third strip-shaped electrode 30 in the second direction Y. In the embodiment, the width of each of the third strip-shaped electrodes 30 in the second direction Y is C/M, where M is a positive integer greater than 1. Optionally, M may equal to 4, which is not limited herein, as the case may be.

In some embodiments, the multiple third strip-shaped electrodes 30 electrically connected are arranged alternately with the first touch electrode units 10 in a one-to-one manner in the second direction Y. In those embodiments, it is convenient to electrically connect the third strip-shaped electrodes 30 in the third touch electrode unit 300. Also, it is relieved a graphic-visible phenomenon which occurs since the third strip-shaped electrodes 30 of the third touch electrode units 300 do not respond timely due to overlong electrical connection lines between the third strip-shaped electrodes 30 of the third touch electrode units 300, thereby further improving the display effect of the touch display panel.

It should be noted that, in the above embodiment, the second direction Y is the same as the extending direction of the data line in the touch display panel.

In summary, in the touch display panel according to the embodiments of the present disclosure, the ratio between the effective width of the second touch electrode unit 200 in the first direction, and the width of the first touch electrode unit 10 in the first direction is in the range from 0.8 to 1.2 inclusively, and the ratio between the effective width of the second touch electrode unit 200 in the second direction, and the width of the first touch electrode unit 10 in the second direction is in the range from 0.5 to 1.5 inclusively. The ratio between the effective width of the third touch electrode unit 300 in the first direction, and the width of the first touch electrode unit 10 in the first direction is in the range from 0.8 to 1.2 inclusively, and the ratio between the effective width of the third touch electrode unit 300 in the second direction, and the width of the first touch electrode unit 10 in the second direction is in the range from 0.5 to 1.5 inclusively. Therefore, it is relieved the graphic-visible phenomenon caused by the large difference between any two of the width of the first touch electrode unit 10, the effective width of the second touch electrode unit 200 and the effective width of the third touch electrode unit 300 when the first touch electrode unit 10, the second touch electrode unit 200 and the third touch electrode unit 300 serve as common electrodes, thereby improving the display effect of the touch display panel.

Various parts of the specification are described in a progressive way, and each part lays emphasis on differences from other parts. For the same or similar parts between various parts, one may refer to the description of other parts.

It should be noted that, the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

According to the above description of the disclosed embodiments, those skilled in the art can implement or practice the present disclosure. Many changes to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A touch display panel, comprising: a plurality of first touch electrode units and a plurality of second touch electrode units, wherein the plurality of first touch electrode units are arranged in an array in a first direction and a second direction, and the plurality of first touch electrode units are insulated from one another in a display region of the touch display panel;

each of the plurality of second touch electrode units comprises a plurality of second strip-shaped electrodes electrically connected, and the plurality of second strip-shaped electrodes extend in the second direction, at least one of the plurality of first touch electrode units is arranged between any two adjacent second strip-shaped electrodes of the plurality of second touch electrode units in the first direction; and the plurality of second touch electrode units are insulated from one another in the display region of the touch display panel, and a ratio of an effective width of each of the plurality of second touch electrode units in the first direction to a width of each of the plurality of first touch electrode units in the first direction is in a range from 0.8 to 1.2 inclusively.

2. The touch display panel according to claim 1, further comprising: a plurality of third touch electrode units, wherein
    each of the plurality of third touch electrode units comprises a plurality of third strip-shaped electrodes electrically connected, at least one of the plurality of first touch electrode units is arranged between any two adjacent third strip-shaped electrodes of the plurality of third strip-shaped electrodes in the second direction; and
    the plurality of third touch electrode units are insulated from one another and are insulated from the plurality of second touch electrode units in the display region of the touch display panel, and a ratio of an effective width of each of the third touch electrode units in the first direction to the width of each of the first touch electrode units in the first direction is in a range from 0.8 to 1.2 inclusively.

3. The touch display panel according to claim 2, wherein the width of each of the first touch electrode units in the first direction equals to the effective width of each of the second touch electrode units in the first direction and/or the effective width of each of the third touch electrode units in the first direction.

4. The touch display panel according to claim 3, wherein, in one of the plurality of second touch electrode units, the plurality of second strip-shaped electrodes each have a same width in the first direction.

5. The touch display panel according to claim 4, wherein the width of each of the first touch electrode units in the first direction is N times the width of each of the plurality of second strip-shaped electrodes in the first direction, with N being a positive integer greater than 1.

6. The touch display panel according to claim 5, wherein the plurality of second strip-shaped electrodes electrically connected are arranged alternately with the plurality of first touch electrode units in a one-to-one manner in the first direction.

7. The touch display panel according to claim 6, further comprising:
    a first insulation layer, wherein the first insulation layer comprises a plurality of via holes; and
    a touch metal layer, wherein the touch metal layer comprises a plurality of second electrode connection lines and a plurality of third electrode connection lines, the plurality of second strip-shaped electrodes of each of the second touch electrode units are electrically connected via the second electrode connection lines through the via holes, and the plurality of third strip-shaped electrodes of each of the third touch electrode units are electrically connected via the third electrode connection lines through the via holes.

8. The touch display panel according to claim 7, wherein the touch metal layer further comprises a plurality of touch signal lines;
    wherein each of the plurality of first touch electrode units is electrically connected to at least one of the touch signal lines, each of the plurality of second touch electrode units is electrically connected to at least one of the touch signal lines and each of the plurality of third touch electrode units is electrically connected to at least one of the touch signal lines, the plurality of touch signal lines are configured to transmit signals to the first touch electrode units, the second touch electrode units and the third touch electrode units.

9. The touch display panel according to claim 8, wherein the first direction is the same as an extending direction of a gate line in the touch display panel.

10. The touch display panel according to claim 2, wherein a ratio of an effective width of each of the plurality of second touch electrode units in the second direction to a width of each of the first touch electrode units in the second direction is in a range from 0.5 to 1.5 inclusively; and a ratio of an effective width of each of the plurality of third touch electrode units in the second direction to the width of each of the first touch electrode units in the second direction is in a range from 0.5 to 1.5 inclusively.

11. The touch display panel according to claim 10, wherein the width of each of the first touch electrode units in the second direction equals to the effective width of each of the second touch electrode units in the second direction and/or the effective width of each of the third touch electrode units in the second direction.

12. The touch display panel according to claim 11, wherein, in one of the plurality of third touch electrode units, the plurality of third strip-shaped electrodes each have a same width in the second direction.

13. The touch display panel according to claim 12, wherein the width of each of the first touch electrode units in the second direction is M times a width of each of the plurality of third strip-shaped electrodes in the second direction, with M being a positive integer greater than 1.

14. A touch display panel, comprising: a plurality of first touch electrode units and a plurality of second touch electrode units, wherein
    the plurality of first touch electrode units are arranged in an array in a first direction and a second direction, and the plurality of first touch electrode units are insulated from one another in a display region of the touch display panel;
    each of the plurality of second touch electrode units comprises a plurality of second strip-shaped electrodes electrically connected, and the plurality of second strip-shaped electrodes extend in the second direction, at least one of the plurality of first touch electrode units is arranged between any two adjacent second strip-shaped electrodes of the plurality of second touch electrode units in the first direction; and
    the plurality of second touch electrode units are insulated from one another in the display region of the touch display panel, and a ratio of an effective width of each of the plurality of second touch electrode units in the first direction to a width of each of the plurality of first touch electrode units in the first direction is in a range from 0.8 to 1.2 inclusively;
    wherein the touch display panel further comprises: a plurality of third touch electrode units, wherein
    each of the plurality of third touch electrode units comprises a plurality of third strip-shaped electrodes electrically connected, at least one of the plurality of first touch electrode units is arranged between any two adjacent third strip-shaped electrodes of the plurality of third strip-shaped electrodes in the second direction; and
    the plurality of third touch electrode units are insulated from one another and are insulated from the plurality of second touch electrode units in the display region of the touch display panel, and a ratio of an effective width of each of the third touch electrode units in the first direction to the width of each of the first touch electrode units in the first direction is in a range from 0.8 to 1.2 inclusively;

wherein the width of each of the first touch electrode units in the first direction equals to the effective width of each of the second touch electrode units in the first direction and/or the effective width of each of the third touch electrode units in the first direction;

wherein, in one of the plurality of second touch electrode units, the plurality of second strip-shaped electrodes each have a same width in the first direction;

wherein the width of each of the first touch electrode units in the first direction is N times the width of each of the plurality of second strip-shaped electrodes in the first direction, with N being a positive integer greater than 1; and wherein N equals to 4.

15. A touch display panel, comprising: a plurality of first touch electrode units and a plurality of second touch electrode units, wherein the plurality of first touch electrode units are arranged in an array in a first direction and a second direction, and the plurality of first touch electrode units are insulated from one another in a display region of the touch display panel;

each of the plurality of second touch electrode units comprises a plurality of second strip-shaped electrodes electrically connected, and the plurality of second strip-shaped electrodes extend in the second direction, at least one of the plurality of first touch electrode units is arranged between any two adjacent second strip-shaped electrodes of the plurality of second touch electrode units in the first direction; and the plurality of second touch electrode units are insulated from one another in the display region of the touch display panel, and a ratio of an effective width of each of the plurality of second touch electrode units in the first direction to a width of each of the plurality of first touch electrode units in the first direction is in a range from 0.8 to 1.2 inclusively;

wherein the touch display panel further comprises: a plurality of third touch electrode units, wherein each of the plurality of third touch electrode units comprises a plurality of third strip-shaped electrodes electrically connected, at least one of the plurality of first touch electrode units is arranged between any two adjacent third strip-shaped electrodes of the plurality of third strip-shaped electrodes in the second direction; and the plurality of third touch electrode units are insulated from one another and are insulated from the plurality of second touch electrode units in the display region of the touch display panel, and a ratio of an effective width of each of the third touch electrode units in the first direction to the width of each of the first touch electrode units in the first direction is in a range from 0.8 to 1.2 inclusively;

wherein a ratio of an effective width of each of the plurality of second touch electrode units in the second direction to a width of each of the first touch electrode units in the second direction is in a range from 0.5 to 1.5 inclusively; and a ratio of an effective width of each of the plurality of third touch electrode units in the second direction to the width of each of the first touch electrode units in the second direction is in a range from 0.5 to 1.5 inclusively;

wherein the width of each of the first touch electrode units in the second direction equals to the effective width of each of the second touch electrode units in the second direction and/or the effective width of each of the third touch electrode units in the second direction;

wherein, in one of the plurality of third touch electrode units, the plurality of third strip-shaped electrodes each have a same width in the second direction;

wherein the width of each of the first touch electrode units in the second direction is M times a width of each of the plurality of third strip-shaped electrodes in the second direction, with M being a positive integer greater than 1; and wherein M equals to 4.

16. The touch display panel according to claim 15, wherein the plurality of third strip-shaped electrodes electrically connected are arranged alternately with the plurality of first touch electrode units in a one-to-one manner in the second direction.

17. The touch display panel according to claim 16, wherein the plurality of first touch electrode units, the plurality of second touch electrode units and the plurality of third touch electrode units serve as touch electrodes in a touch period and serve as common electrodes in a display period, and the common electrodes provide a common signal to a display pixel.

18. The touch display panel according to claim 17, wherein the plurality of first touch electrode units, the plurality of second touch electrode units and the third plurality of touch electrode units serve as self-capacitive touch electrodes.

19. The touch display panel according to claim 15, wherein the second direction is the same as an extending direction of a data line in the touch display panel.

* * * * *